(12) United States Patent
Brodersen et al.

(10) Patent No.: US 11,110,901 B2
(45) Date of Patent: Sep. 7, 2021

(54) VEHICLE WHEEL CLEANING APPARATUS

(71) Applicants: Dean Tyler Brodersen, Mayerthorpe (CA); Amy Brandl, Mayerthorpe (CA)

(72) Inventors: Dean Tyler Brodersen, Mayerthorpe (CA); Amy Brandl, Mayerthorpe (CA)

( * ) Notice: Subject to any disclaimer, the term of this patent is extended or adjusted under 35 U.S.C. 154(b) by 246 days.

(21) Appl. No.: 16/373,574

(22) Filed: Apr. 2, 2019

(65) Prior Publication Data

US 2020/0317163 A1 Oct. 8, 2020

(51) Int. Cl.
*B60S 3/04* (2006.01)
*B08B 3/02* (2006.01)

(52) U.S. Cl.
CPC .............. *B60S 3/042* (2013.01); *B60S 3/048* (2013.01); *B08B 3/026* (2013.01); *B08B 2203/0247* (2013.01)

(58) Field of Classification Search
None
See application file for complete search history.

(56) References Cited

U.S. PATENT DOCUMENTS

| 9,676,007 B1* | 6/2017 | Kane | B05B 15/652 |
| 2007/0108314 A1* | 5/2007 | Cutler | E03C 1/084 |
| | | | 239/428.5 |

* cited by examiner

*Primary Examiner* — Cristi J Tate-Sims
(74) *Attorney, Agent, or Firm* — Gulf Coast Intellectual Property Group

(57) ABSTRACT

A vehicle wheel cleaning apparatus configured to provide cleaning of a vehicle wheel particularly the interior surfaces thereof. The vehicle wheel cleaning apparatus is operable to be coupled to a water source such as but not limited to a pressure wand. A clamping member is included to provide a sealable coupling to the water source. The clamping member has a first portion secured to the water source and a second portion secured to the apparatus. A rotational coupling is provided and is configured to allow rotational movement of a ball assembly. The ball assembly includes a stem member secured to the rotational coupling and a solid silicon ball. Formed in the ball is a channel wherein the channel has divergent portions that are directed to opposing sides of the ball so as to discharge water therefrom.

8 Claims, 1 Drawing Sheet

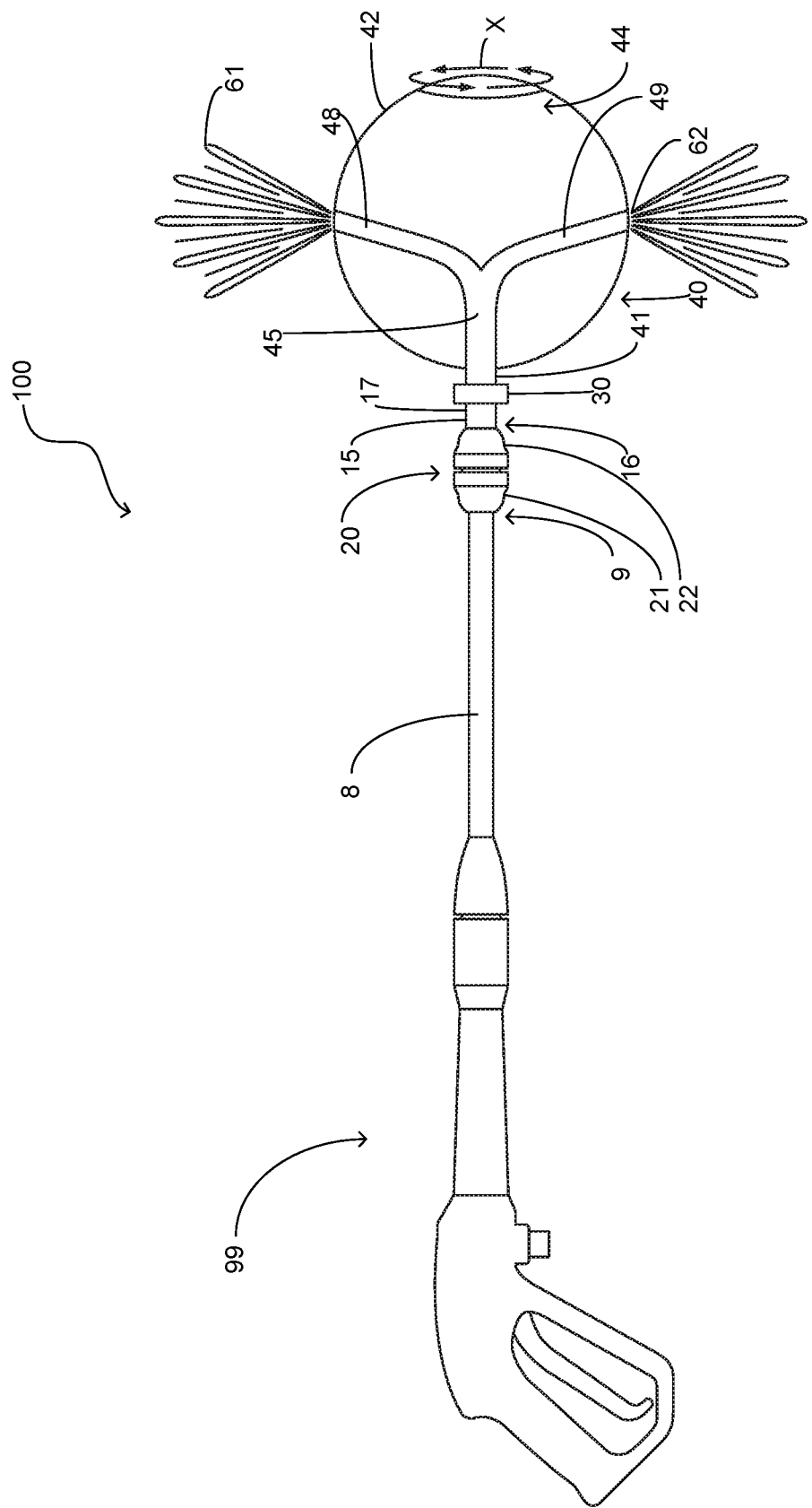

VEHICLE WHEEL CLEANING APPARATUS

FIELD OF THE INVENTION

The present invention relates generally to vehicle cleaning apparatus, more specifically but not by way of limitation, a vehicle wheel cleaning apparatus that is configured to be operably coupled to a pressure wand wherein the apparatus of the present invention is configured to provide improved cleaning of the wheels of a vehicle.

BACKGROUND

Routine maintenance of a vehicle is important in securing the proper performance and longevity of the vehicle. Routine maintenance includes activities such as but not limited to oil changes and other mechanical procedures such as but not limited to brake pad replacements. Another protocol that is implemented as part of routine care and maintenance of a vehicle is cleaning of the vehicle. Cleaning of the vehicle ensures proper care of body parts such as but not limited to the exterior and its paint coating. One important part of the vehicle to maintain the cleanliness thereof are the wheels. As is known in the art, the wheels of a vehicle typically accumulate brake dust, grime and other matter and are often the dirtiest part of the vehicle. One issue with dirty wheels is the negative impact that the soiled wheels can have on the vehicle's performance. The accumulation of dirt and grime on vehicle wheels can have a negative affect on the rotational balance thereof. As dirt accumulates in certain areas of the wheel, the rotational balance is altered and as such will cause the wheel to vibrate. Wheel vibration can lead to minor issues such as passenger annoyance but can also lead to mechanical failure of other parts of the vehicle. It is important to maintain clean wheels on a vehicle.

One issue with traditional vehicle cleaning equipment is their inability to effectively clean the wheels of a vehicle. Many vehicle wheels have slots and other features that allow dirt and grime to be deposited on the interior of the wheel. Utilization of high pressure wands and the like can provide effective removal of dirt from the outer surface of the wheel but have proven ineffective for removing dirt on the interior surface of the wheel where typically more dirt and grime has accumulated. The streams of water egressing from traditional water hose nozzles and high pressure wands are not dispersed at the required angle to effectively clean the interior surfaces of the vehicle wheel.

Accordingly, there is a need for a vehicle wheel cleaning apparatus that can be operably coupled to a water hose or high pressure water wand that is operably to provide at least one stream of water that will effectively engage the interior of the vehicle wheel and as such provide the necessary cleaning thereof.

SUMMARY OF THE INVENTION

It is the object of the present invention to provide a vehicle wheel cleaning apparatus that is configured to be releasably secured to a water source wherein the present invention includes a clamp member operable to provide coupling with a water source.

Another object of the present invention is to provide a vehicle wheel cleaning apparatus that is configured to provide cleaning of the interior of a vehicle wheel wherein the water source is a conventional water hose or a high pressure water wand.

A further object of the present invention is to provide a vehicle wheel cleaning apparatus that is configured to be releasably secured to a water source wherein the present invention includes a rotatable coupling downstream of the clamp member.

Still another object of the present invention is to provide a vehicle wheel cleaning apparatus that is configured to provide cleaning of the interior of a vehicle wheel wherein the rotatable coupling includes a tube member operably coupled thereto.

An additional object of the present invention is to provide a vehicle wheel cleaning apparatus that is configured to be releasably secured to a water source wherein the tube member includes a ball member secured thereto distal to said rotatable coupling.

Yet a further object of the present invention is to provide a vehicle wheel cleaning apparatus that is configured to provide cleaning of the interior of a vehicle wheel wherein the ball member includes at least one passage that is fluidly coupled to the tube member.

Another object of the present invention is to a provide a vehicle wheel cleaning apparatus that is configured to be releasably secured to a water source wherein the at least one passage includes a discharge port that is off axis with the tube member.

An alternate object of the present invention is to provide a vehicle wheel cleaning apparatus that is configured to provide cleaning of the interior of a vehicle wheel wherein the ball member is formed form silicon or similar material and is rotatable.

An additional object of the present invention is to provide a vehicle wheel cleaning apparatus that is configured to be releasably secured to a water source wherein the ball member is of suitable size so as to be journaled through apertures present on vehicle wheels.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

FIG. 1 is perspective view of a preferred embodiment of the present invention.

DETAILED DESCRIPTION

Referring now to the drawings submitted herewith, wherein various elements depicted therein are not necessarily drawn to scale and wherein through the views and FIGURES like elements are referenced with identical reference numerals, there is illustrated a vehicle wheel cleaning apparatus 100 constructed according to the principles of the present invention.

An embodiment of the present invention is discussed herein with reference to the FIGURES submitted herewith. Those skilled in the art will understand that the detailed description herein with respect to these FIGURES is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms "a", "an" and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

Now referring in particular to the FIGURE submitted herewith, the vehicle wheel cleaning apparatus 100 is operably coupled to an exemplary pressure washing wand 99. While the vehicle wheel cleaning apparatus 100 is illustrated herein as being operably coupled to an exemplary pressure washing wand 99, it is contemplated within the scope of the present invention that the vehicle wheel cleaning apparatus 100 could be operably coupled to other traditional water sources such as but not limited to a garden hose. As will be further discussed herein the clamp member 20 could have alternative embodiments so as to facilitate the operable coupling of the vehicle wheel cleaning apparatus 100 to alternate water sources.

The vehicle wheel cleaning apparatus 100 includes a tube member 15. The tube member 15 is manufactured from a durable rigid material such as but not limited to metal tubing and has a hollow passage running therethrough that is operable to provide water flow downstream outward from the vehicle wheel cleaning apparatus 100. The tube member 15 includes a first end 16 and a second end 17 and it is contemplated within the scope of the present invention that the tube member 15 could be manufactured in various diameters.

Secured to the tube member proximate the first end 16 thereof is the clamping member 20. The clamping member 20 is configured to provide the operable coupling of the vehicle wheel cleaning apparatus 100 with a desired water source such as but not limited to the exemplary pressure washing wand 99. The clamping member 20 includes a first portion 21 and a second portion 22 that are structured to provide a sealable watertight coupling of the vehicle wheel cleaning apparatus 100 and the exemplary pressure washing wand 99. The first portion 21 of the clamping member 20 is secured to the end 9 of wand 8 utilizing suitable mechanical techniques. The second portion 22 of the clamping member 20 is subsequently operably coupled to the first portion 21. It is contemplated within the scope of the present invention that the clamping member 20 could utilize various mechanical methods to facilitate the securing of the first portion 21 to wand 8 and further secure the first portion 21 to the second portion 22. By way of example but not limitation, the clamping member 20 could employ push-fit style of plumbing connections or utilize threaded connections. As previously discussed herein, as it is contemplated within the scope of the present invention that the vehicle wheel cleaning apparatus 100 could be coupled to alternate water sources, the type and style of mechanical connections of the clamping member 20 will vary depending on the style of the water source.

Secured to the tube member 15 proximate the second end 17 thereof is the rotatable coupling 30. The rotatable coupling 30 is configured to provide rotational movement (as indicated by directional arrows X) of the ball assembly 40. The rotatable coupling 30 includes a bearing assembly (not particularly illustrated herein) the allows the ball assembly 40 to rotate with respect to the tube member 15. The rotatable coupling 30 is manufactured so as to provide a watertight connection between the ball assembly 40 and the tube member 15. It is contemplated within the scope of the present invention that the rotatable coupling could be manufactured utilizing elements in place of and/or in conjunction with a bearing assembly so as to provide the desired functionality as described herein.

The ball assembly 40 includes stem member 41 and ball 42. The stem member 41 is a conventional metal tube that is sealably coupled to the ball 42 and is further secured to the rotatable coupling 30. The stem member 41 is hollow allowing water from the exemplary pressure washing wand 99 to flow therethrough. It is contemplated within the scope of the present invention that the stem member 41 could be manufactured in alternate lengths and diameters. The stem member 41 is sealably secured to the ball 42 utilizing suitable watertight techniques such as but not limited to chemical adhesion. The stem member 41 is fluidly coupled to channel 45 formed in the interior of the ball 42. The channel 45 is hollow which allows water to flow therethrough and continue into the divergent channel portions 48,49.

The ball 42 is a solid ball and is manufactured from a material such as but not limited to silicon. While various materials could be utilized to manufacture the ball 42, it is desired within the scope of the present invention to utilize silicon or other similar material so as to inhibit damage to a vehicle wheel when engaged therewith. It is further contemplated within the scope of the present invention that the outer surface 44 could have disposed thereon additional cleaning elements such as but not limited to short brushing bristles to provide additional cleaning of the vehicle wheel.

The divergent channel portions 48,49 are angular with respect to the channel 45. While no particular angle is required, it is desired within the scope of the present invention that the divergent channel portions 48,49 are approximately five to one hundred and seventy five degrees with respect to the channel 45. The divergent channel portions 48,49 include discharge ports 61,62 that are operable to allow water to egress therefrom. The angular positioning of the divergent channel portions 48,49 provides the rotational movement of the ball assembly 40 subsequent water being discharge from the discharge ports 61,62. As water egressing from the discharge ports 61,62 the ball 42 will begin to rotate. The ball 42 is then placed in areas of the vehicle wheel wherein the water exiting the discharge ports 61,62 is directed at portions of the wheel such as the interior surface and will provide cleaning thereof. While the ball 42 is illustrated herein as having two divergent channel portions 48,49, it is contemplated within the scope of the present invention that the ball 42 could have as few as one divergent channel portion or more than two divergent channel portions. It is further contemplated within the scope of the present invention that the diameter of the divergent channel portions 48,49 could be provided in alternate sizes.

While rotational movement of the ball assembly 40 is desired in the preferred embodiment, it is contemplated within the scope of the present invention that the rotatable coupling 30 could be transitioned to a locked position so as to maintain the ball assembly 40 in a fixed position.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding description is, therefore, not intended to be limited to the specific forms set forth herein, but on the contrary, it is intended to cover such alternatives, modifications, and equivalents, as can be reasonably included within the spirit and scope of the invention.

What is claimed is:

1. A vehicle wheel cleaning apparatus that is configured to be operably coupled to a water source wherein the vehicle wheel cleaning apparatus is configured to provide cleaning of the interior surface of the wheels comprising:
   a clamping member, said clamping member having a first portion and a second portion, said clamping member configured to sealably secure the vehicle wheel cleaning apparatus to a water source;
   a tube member, said tube member being hollow, said tube member having a first end and a second end, said tube member being operably coupled to said clamping member proximate said first end thereof;
   a rotatable coupling, said rotatable coupling being secured to said second end of said tube member, said rotatable coupling configured to provide rotational movement of a ball assembly;
   a ball assembly, said ball assembly having a stem member, said stem member being tubular and hollow, said stem member having a first end and a second end, said stem member being sealably secured to said rotatable coupling, said ball assembly further including a ball, said ball being spherical in shape, said ball having a channel formed therein, said channel being fluidly coupled to said stem member, said channel having a plurality of divergent portions, said plurality of divergent portions being contiguous with said channel, said plurality of divergent portions having discharge ports configured to provide egression of water therefrom, wherein said discharge ports provide egression from water laterally with respect to said stem member so as to produce a spray pattern off axis therefrom.

2. The vehicle wheel cleaning apparatus as recited in claim 1, wherein said first portion of said clamping member is configured to operably couple to the water source.

3. The vehicle wheel cleaning apparatus as recited in claim 2, wherein said second portion of said clamping member is configured to operably couple with said first portion of said clamping member and provide a watertight connection therebetween.

4. The vehicle wheel cleaning apparatus as recited in claim 3, wherein water egressing from the discharge ports is operable to provide rotational movement of the ball.

5. The vehicle wheel cleaning apparatus as recited in claim 4, wherein the rotational coupling further includes a locked position, wherein subsequent being moved to the locked position the rotational coupling is fixed.

6. The vehicle wheel cleaning apparatus as recited in claim 5, wherein the ball is a solid silicon ball.

7. The vehicle wheel cleaning apparatus as recited in claim 6, wherein the plurality of divergent portions is angular to the stem member having an angle therebetween of approximately five to one hundred and seventy five degrees.

8. A vehicle wheel cleaning apparatus that is configured to be operably coupled to a water source wherein the vehicle wheel cleaning apparatus is configured to provide cleaning of the interior surface of the wheels comprising:
   a clamping member, said clamping member having a first portion and a second portion, said clamping member configured to sealably secure the vehicle wheel cleaning apparatus to a water source, said first portion of said clamping member is configured to operably couple to the water source, said second portion of said clamping member is configured to operably couple with said first portion of said clamping member and provide a watertight connection therebetween;
   a tube member, said tube member being hollow, said tube member having a first end and a second end, said tube member being operably coupled to said clamping member proximate said first end thereof;
   a rotatable coupling, said rotatable coupling being secured to said second end of said tube member, said rotatable coupling configured to provide rotational movement of a ball assembly;
   a ball assembly, said ball assembly having a stem member, said stem member being tubular and hollow, said stem member having a first end and a second end, said stem member being sealably secured to said rotatable coupling, said ball assembly further including a ball, said ball being a solid silicon ball that is spherical in shape, said ball having a channel formed therein, said channel being fluidly coupled to said stem member, said channel having two divergent portions, said two divergent portions being contiguous with said channel, said two divergent portions having discharge ports configured to provide egression of water therefrom, wherein the two divergent portions are angular to the stem member having an angle therebetween of approximately five to one hundred and seventy five degrees; and
   wherein discharge of water from the discharge ports provides rotation of the ball.

* * * * *